March 31, 1925.
D. S. BARROWS
TRUCK SIDE FRAME
Filed Oct. 17, 1922
1,532,025
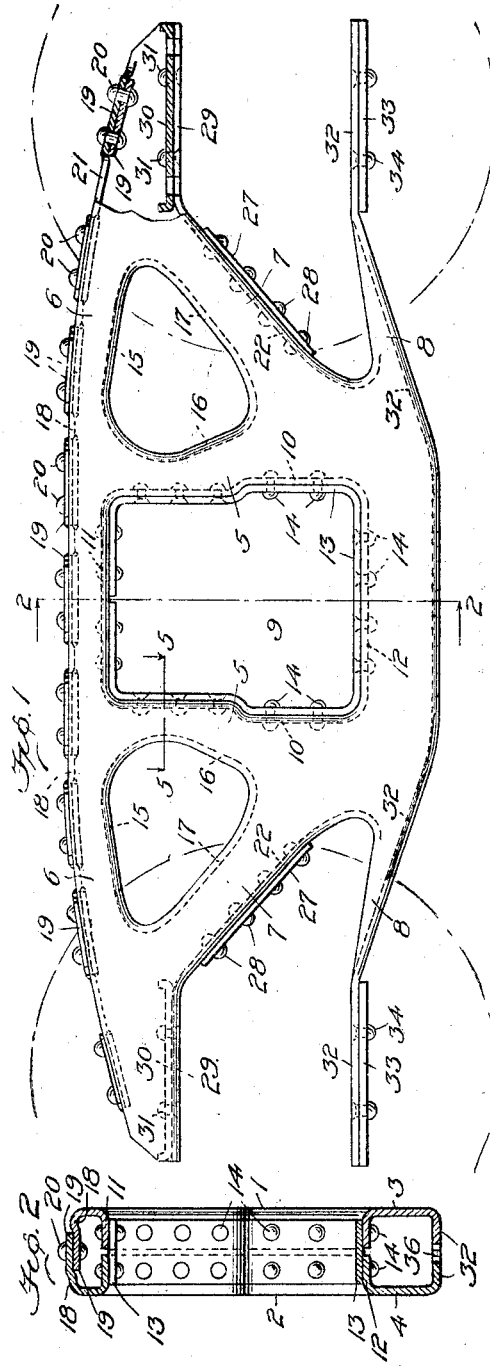
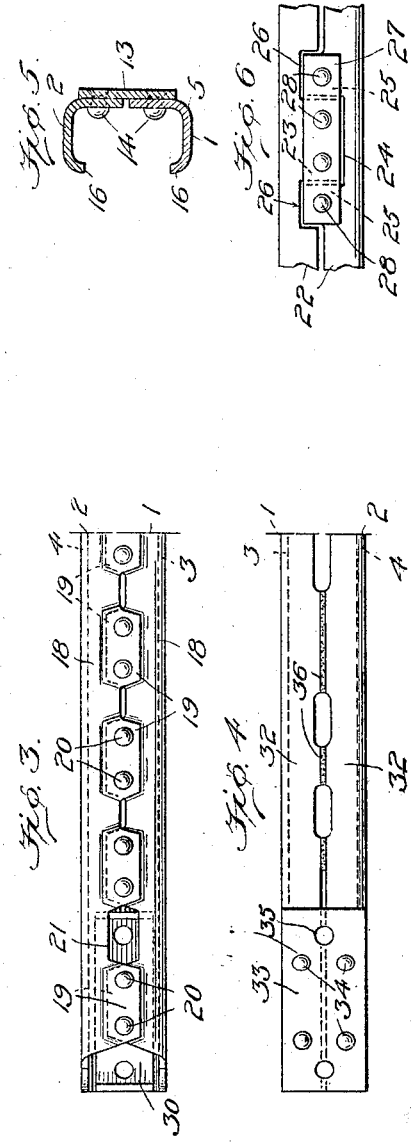

Patented Mar. 31, 1925.

1,532,025

UNITED STATES PATENT OFFICE.

DONALD S. BARROWS, OF ROCHESTER, NEW YORK, ASSIGNOR, BY MESNE ASSIGNMENTS, TO THE SYMINGTON COMPANY, A CORPORATION OF MARYLAND.

TRUCK SIDE FRAME.

Application filed October 17, 1922. Serial No. 595,186.

*To all whom it may concern:*

Be it known that I, DONALD S. BARROWS, a citizen of the United States, residing at Rochester, in the county of Monroe and State of New York, have invented certain new and useful Improvements in Truck Side Frames; and I do hereby declare the following to be a full, clear, and exact description of the invention, such as will enable others skilled in the art to which it appertains to make and use the same.

My invention relates to side frames for car trucks and has been primarily designed to provide a construction which is very strong and stiff, but comparatively light in weight, and in which costs incident to production and maintainance are reduced to a minimum.

The principal feature of the invention, generally stated, consists in forming a car truck side frame from complementary sheet metal sections arranged in spaced relation to provide an outer wall and an inner wall, each of said sections being provided with a plurality of truck column portions, a plurality of top arch bar portions, a plurality of bottom arch bar portions, and a plurality of pedestal tie bar portions.

Particularly stated, my invention has for an object the production of a truck side frame from flanged wrought metal blanks, assembled in spaced relation with their flanges oppositely directed and united at a plurality of points by rivets and at other points by welding.

The invention has for another object to provide a truck side frame from complementary sheet metal sections having corresponding side frame portions, said sections being adapted to be united at certain points by means of a tie member which bridges the flanges of the sections and also serve to reinforce the strength value of said sections.

A still further feature of the invention consists in providing a cambered car truck side frame formed of separate pressed metal sections, said sections being arranged in spaced relation and each having a plurality of stiffening flanges, some of said flanges being overlapped and united at spaced intervals at the top of the side frame and others of said flanges being united by a longitudinally disposed splice member, said splice member providing for a single row of rivets arranged centrally of the pressed metal sections.

Another object of the invention is to provide a reinforcing and connecting means for the flanged complementary sections, said means being adapted to bridge and unite the inwardly extending stiffening flanges which border the bolster opening adjacent the truck column portions, the spring plank seat portions and the intermediate part of the top arch bar portions extending between the truck columns.

The invention further consists in the method of manufacturing car truck side frames from complementary sheet metal blanks having corresponding side frame portions, bending stiffening flanges from said blanks, said stiffening flanges being adapted to extend inwardly from each side wall of the side frame, and uniting the blanks in spaced parallel relation throughout their length.

There are other features of the invention relating to the particular construction of the parts, as will more fully hereinafter appear.

In the drawings chosen to illustrate my invention, the scope whereof is pointed out in the claims:

Figure 1 is a view partly in side elevation and partly in vertical section of a car truck side frame embodying the invention, the wheels of the truck being shown in dotted lines.

Figure 2 is a vertical transverse sectional view through the side frame on the line 2—2 of Figure 1.

Figure 3 is a top plan view of a one-half portion of the side frame.

Figure 4 is a bottom plan view of a one-half portion of the side frame.

Figure 5 is a detail horizontal sectional view on the line 5—5 of Figure 1.

Figure 6 is a detail bottom plan view of the bottom arch bar portions shown connected by the longitudinally disposed splice member and connecting rivets.

Referring to the drawings in which corresponding reference characters designate similar parts in the several views, my improved side frame is formed of complementary sheet metal sections or members 1 and 2, the former constituting the outer wall 3 and the latter forming the inner wall 4 of the side frame. The inner and outer walls are arranged in spaced relation and are each formed from a single continuous sheet metal blank. Each of the blanks is provided with a plurality of truck column portions 5, a plurality of top arch bar portions 6, a plurality of bottom arch bar portions 7, and a plurality of pedestal tie bar portions 8, a bolster opening 9 being formed between the truck column portions in each blank, as shown.

Each of the continuous sheet metal blanks is formed with stiffening flanges adapted to extend inwardly of the side frame, said flanges serving to effectively brace the side frame against transverse, longitudinal, and other thrusts incident to service conditions. In my present construction portions of the stiffening flanges are utilized to unite the blanks or side wall portions of the side frame by welding operations and other portions of said flanges are overlapped at spaced intervals and firmly united by riveting.

The metal blank sections are each provided with inwardly extending stiffening flanges 10 which border the adjacent sides of the truck column portions 5 of the respective inner and outer side walls. The flanges 10 merge into and are united at their upper ends by flanges 11 which latter stiffen the central or intermediate part of the top arch bar portions. The lower portions of the truck column flanges 10 merge into and are continuous with inwardly extending stiffening flanges 12 adapted to form the spring plank seat portion of the side frame. The respective flanges 10, 11, and 12 which border the bolster opening are continuous and preferably relatively wide, as best shown in Figure 5. Surrounding the bolster and connecting the respective stiffening flanges of the side wall sections is a band or lining member 13, said band being connected by means of rivets 14 to the truck column flanges and spring plank seat flanges. The band or encircling reinforcing member 13 preferably bridges the adjacent inwardly extending stiffening flanges a considerable distance, the edges of said band, however, terminating short of the side walls of the side frame. The interpositioning of the band 13 serves to materially reinforce portions of the side frame adjacent the bolster opening, the band being continuous around the corner bends uniting the truck column portions at their respective upper and lower ends with the top arch bar portions, and the bottom arch bar portions and pedestal tie bar portions. Failures of the side frame at or near these and other critical points are, as a result of the foregoing construction, reduced to a minimum.

The lower edges of the top arch bar portions 6 of the sheet metal or wall sections are preferably reinforced by oppositely inwardly extending flanges 15. The outer edge of each truck column portion is likewise preferably reinforced by inwardly extending flanges 16, while the upper edges of the lower arch bar portions 7 may advantageously be provided with similar stiffening flanges 17, said flanges 15, 16, and 17 being continuous and forming a substantially triangular opening or window in the side frame.

The top portion of the side frame is preferably arranged to form a compression member, preferably having a camber therein, the inwardly extending flanges 18 being provided on each complementary sheet metal blank and having portions of their opposed edges arranged in close spaced relation at intervals on a longitudinal line passing through the side frame. Each inwardly extending stiffening flange 18 is provided along its edge portion with projections or tabs 19, said tabs being arranged at spaced intervals, as clearly shown in the drawings. The projections 19 of adjacent portions of the stiffening flanges are adapted to be overlapped and firmly united by means of rivets 20. The adjacent overlapped tabs or projections are preferably offset, as shown in Figure 2, so as to provide a uniform series of joints along the upper edges of the top arch bar portions. The rivets 20 are disposed along a central longitudinal plane passing between the sheet metal sections, a plurality of rivets being preferably utilized to join the respective overlapped tabs or projections provided on the adjacent inwardly extending flanges 18. Journal box bolt openings 21 may be provided near each end of the top arch bar portions to permit insertion of the journal box bolts.

The bottom arch bar portions 7 and more particularly the lower edges thereof are provided with inwardly extending stiffening flanges 22, said flanges being provided with projecting portions adapted to extend into recessed or cut away portions of the respective adjacent flange, as shown in Figure 6. One of the flanges is shown as provided with relatively large projections 23, said projections extending into a recess or cut away portion 24 provided in the adjacent flange. The said adjacent flange 22 is provided with relatively small projections 25 which are adapted to extend into recesses or cut away portions 26 provided in the flange 22 from which extends the large projection 23. The respective projections are arranged to interlock and longitudinally overlie each other and are firmly united by a splice bar or member 27. The splice bar is of a width substantially equal to the full depth of the respective projections and extends upon each side of the longitudinal center passing between the bottom arch bar portions. A centrally located longitudinally disposed line of rivets 28 connect the respective projections 23 and 25 with the splice bar 27. A strong tie and splice connection of comparatively simple construction is thereby provided, the splice bar serving to reinforce the strength value of the bottom arch bar portions.

The flanges 22 of the bottom arch bar portions are prolonged above the journal boxes, as indicated by the numeral 29. These prolonged portions are united by a plate 30 firmly connected to said flanges by means of rivets 31. The opposite ends of the plate 30 may be bent upwardly to engage the faces of the journal box bolts and prevent their rotation. In addition, the plate 30 serves to reinforce the bottom arch bar portions which receive the journal box bolts.

The pedestal tie bar portions 8 of the complementary sheet metal sections are each provided with inwardly extending stiffening flanges 32, said flanges extending beneath the bottom arch bar portions and bolster opening and terminating in substantially flat ends adapted to be connected to the underside of the journal box. The respective flat ends of the flanges are united by a plate 33 which bridges the flanges and is connected thereto by means of rivets 34. Journal box bolt openings 35 are provided in said plate, as shown. In addition to tying the pedestal tie bar portions together at the ends of the side frame, the plate 33 serves to reinforce said portions and provide means for receiving the journal box bolts.

The flanges 32 are also united at a plurality of points by means of welds 36, said welds being spaced at intervals throughout the length of the pedestal tie bar portions between the journal boxes. These welds are advantageously arranged, the longer welds being provided at the base of the truck column portions and extending around the corner bends, as will be understood.

It will be perceived that a car truck side frame embodying the invention may be manufactured by first forming complementary sheet metal blanks having corresponding side frame portions, cutting or stamping integral projections on said respective blanks which are adapted to be overlapped and united along the top of the side frame, bending other portions of the sheet metal blanks to form flanges, and finally uniting said flanges and overlapped projections by means of longitudinally arranged separate rows of rivets disposed in substantially the same vertical plane. My improved method of manufacture also involves the use of a splice member adapted to connect portions of adjacent intermeshing stiffening flanges, and the utilization of a longitudinally disposed single line of rivets. The use of a band adapted to line the bolster opening and effectively unite the adjacent inwardly extending stiffening flanges projecting from the respective sheet metal side walls is also contemplated in my improved method of assembling and firmly tying the sheet metal blanks together.

It will be noted that the truck side frame embodying my invention can be inexpensively manufactured from reliable material with the parts so formed and united that they will withstand maximum strains under service conditions.

I claim:

1. A car truck side frame involving complementary sheet metal sections united to form an outer and an inner wall arranged in spaced relation, each of said walls having a plurality of truck column portions, a plurality of top arch bar portions, a plurality of bottom arch bar portions, and a plurality of tie bar portions, said top arch bar portions being connected at spaced intervals by means of overlapped portions extending from the complementary sheet metal sections.

2. A car truck side frame involving complementary sheet metal sections united to form an outer wall and an inner wall arranged in spaced relation, each of said walls having a plurality of truck column portions, a plurality of top arch bar portions, a plurality of bottom arch bar portions, and a plurality of pedestal tie bar portions; said top arch bar portions being provided with a plurality of overlapping portions extending from the complementary sheet metal sections, and rivet means uniting said overlapped portions.

3. A car truck side frame involving complementary sheet metal sections united to form an outer wall and an inner wall arranged in spaced relation, each of said walls having a plurality of truck column portions, a plurality of top arch bar portions, a plurality of bottom arch bar portions, and a plurality of pedestal tie bar portions; said top arch bar portions being provided with inwardly extending flanges having spaced overlapped portions, and means uniting said spaced overlapped portions centrally and longitudinally of the side frame.

4. A car truck side frame involving complementary sheet metal sections united to form an outer wall and an inner wall arranged in spaced relation, each of said walls having a plurality of truck column portions, a plurality of top arch bar portions, a plurality of bottom arch bar portions and a plurality of pedestal tie bar portions; said top arch bar portions being united centrally and longitudinally throughout their lengths by a single row of rivets.

5. A car truck side frame including a plurality of sheet metal members united to form spaced side walls, and means including a single row of rivets longitudinally and centrally disposed for uniting said sheet metal members at the top of the side frame.

6. A car truck side frame including complementary wrought metal sections united to form spaced side walls, inwardly extending stiffening flanges provided on said members and having portions adapted to be overlapped with an adjacent portion, and means adapted to unite said overlapped portions centrally and longitudinally of the side frame.

7. A car truck side frame involving separate wrought metal sheets united to form spaced inner and outer side walls, each of said walls including a plurality of cambered top arch bar portions, inwardly extending stiffening flanges provided on said top arch bar portions, a plurality of spaced projections provided on said flanges and adapted to be overlapped, and means uniting said overlapped portions.

8. A car truck side frame involving complementary sheet metal sections united to form an outer wall, and an inner wall arranged in spaced relation, each of said walls having a plurality of truck column portions, a plurality of top arch bar portions, a plurality of bottom arch bar portions, and a plurality of pedestal tie bar portions, said bottom arch bar portions being provided with inwardly extending stiffening flanges provided with portions overlying portions of the adjacent flange longitudinally of the side frame, and means uniting said flanges.

9. A car truck side frame involving complementary sheet metal sections united to form an outer wall and an inner wall arranged in spaced relation, each of said walls having a plurality of truck column portions, a plurality of top arch bar portions, a plurality of bottom arch bar portions, and a plurality of pedestal tie bar portions, said bottom arch bar portions being provided with inwardly extending stiffening flanges provided with portions overlying portions of the adjacent flange longitudinally of the side frame; and a splice member bridging said overlying portions of the flanges for uniting said inwardly extending stiffening flanges.

10. A car truck side frame involving complementary sheet metal sections united to form an outer wall and an inner wall arranged in spaced relation, each of said walls having a plurality of truck column portions, a plurality of top arch bar portions, a plurality of bottom arch bar portions, and a plurality of pedestal tie bar portions, said bottom arch bar portions being provided with inwardly extending stiffening flanges provided with portions overlying portions of the adjacent flange longitudinally of the side frame, a splice member bridging said overlying portions, and rivet means connecting said splice member thereto.

11. In a car truck side frame involving spaced inner and outer side walls, each of said side walls including bottom arch bar portions, inwardly extending stiffening flanges provided on said bottom arch bar portions and provided with portions adapted to overlie each other longitudinally of the side frame, and a splice member connecting said overlying portions.

12. In a car truck side frame involving spaced inner and outer side walls, each of said side walls including bottom arch bar portions, inwardly extending stiffening flanges provided on said bottom arch bar portions and provided with portions adapted to overlie each other longitudinally of the side frame, a splice member uniting said overlying portions, and a single row of rivets connecting said splice member and said overlying portions of the inwardly extending stiffening flanges.

13. A car truck side frame involving spaced wrought metal side walls, each of said side walls including an inwardly extending stiffening flange having portions adapted to overlie portions of an adjacent flange longitudinally of the side frame, and means including a longitudinally disposed row of rivets uniting said overlying portions.

14. A car truck side frame involving spaced wrought metal side walls, each of said side walls including an inwardly extending stiffening flange having portions adapted to overlie portions of an adjacent flange longitudinally of the side frame, a splice member bridging said overlying portions, said splice member being arranged longitudinally of the truck, and a centrally disposed longitudinal row of rivets uniting the splice member to said overlying portions of the inwardly extending stiffening flanges.

15. A car truck side frame involving complementary wrought metal sections united to form outer and inner spaced side walls, means including a single line of longitudinally disposed rivets uniting said sections at the top of the side frame, and other rivet means arranged centrally and longitudinally of the side frame for uniting the wrought metal sections at other points thereof.

16. A car truck side frame involving complementary wrought metal sections united to form outer and inner spaced side walls, means including a single line of longitudinally disposed rivets uniting said sections at the top of the side frame, and weld means uniting said wrought metal sections centrally and longitudinally at the bottom of the side frame.

17. A car truck side frame involving spaced wrought metal side walls, each of said side walls including truck column portions and a bolster opening, inwardly extending stiffening flanges surrounding the bolster opening, and means including a member connecting said inwardly extending stiffening flanges and entirely lining said bolster opening.

18. A car truck side frame involving spaced wrought metal side walls, each of said side walls including truck column portions and a bolster opening inwardly extending stiffening flanges surrounding the bolster opening, and a reinforcing stiffening band uniting said inwardly extending stiffening flanges, said band extending around said opening.

19. A car truck side frame involving spaced wrought metal side walls, each of said side walls including truck column portions and a bolster opening, continuous inwardly extending stiffening flanges adjacent said truck column portions and bordering the bolster opening, and a member connecting said inwardly extending flanges throughout their length, said member being adapted to line the bolster opening.

20. A car truck side frame involving complementary sheet metal sections arranged to form inner and outer spaced side walls, each of said walls having a plurality of truck column portions, a plurality of top arch bar portions, a plurality of bottom arch bar portions, and a plurality of pedestal tie bar portions; inwardly extending stiffening flanges adjacent said truck column portions and top arch bar portions, said inwardly extending stiffening flanges being continued across the spring plank seat portion of the side frame, and a reinforcing member uniting said inwardly extending stiffening flanges, said member being continuous across the spring plank seat portion and around the corner bends uniting the truck column portions and bottom arch bar portions.

21. The method of manufacturing a wrought metal car truck side frame which consists in forming two symmetrical blanks each having corresponding side frame portions, cutting projections on said blanks adapted to be bent and overlapped at spaced intervals at the top of the side frame, cutting other projections on said blanks adapted to be bent to overlie each other longitudinally of the side frame, and uniting said overlapped and overlying portions.

22. The method of manufacturing a wrought metal car truck side frame which consists in forming two symmetrical blanks each having corresponding side frame portions, cutting projections on said blanks adapted to be bent and overlapped at spaced intervals at the top of the side frame, cutting other projections on said blanks adapted to be bent to overlie each other longitudinally of the side frame, uniting said overlapped and overlying portions, and finally welding said blanks at the bottom of the side frame.

In testimony whereof I affix my signature.

DONALD S. BARROWS.